United States Patent [19]

Guha

[11] Patent Number: 6,005,588

[45] Date of Patent: *Dec. 21, 1999

[54] SYSTEM AND METHOD FOR RAPIDLY DISPLAYING TEXT IN A GRAPHICAL USER INTERFACE

[75] Inventor: Ramanathan V. Guha, Los Altos, Calif.

[73] Assignee: Apple Computer, Inc., Cupertino, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/746,083

[22] Filed: Nov. 6, 1996

[51] Int. Cl.$^6$ .................................................. G06F 15/00
[52] U.S. Cl. .............................................. 345/467
[58] Field of Search .................... 345/467, 468, 345/469, 144, 441

[56] References Cited

U.S. PATENT DOCUMENTS

| 4,851,825 | 7/1989 | Naiman | 345/471 |
| 5,731,800 | 3/1998 | Sugaya | 395/143 |

*Primary Examiner*—Phu K. Nguyen
*Attorney, Agent, or Firm*—Fenwick & West LLP

[57] ABSTRACT

A system and method for rapidly displaying text in a graphical user interface or other application. An initialization module accepts character set descriptions and generates executable code for drawing characters in the character set. Common sub-expression elimination is selectively employed to reduce the size of the executable code by replacing pixel-drawing functions with higher-level primitive drawing functions. Anti-aliasing text-drawing executable code is selectively generated. A display module displays text on a screen by calling the functions defined in the executable code generated by the initialization module.

41 Claims, 10 Drawing Sheets

SYSTEM AND METHOD FOR RAPIDLY DISPLAYING TEXT IN A GRAPHICAL USER INTERFACE

BACKGROUND OF THE INVENTION

1. Field of the Invention

The present invention relates generally to the display of text in a graphical user interface, and more particularly, to a system and method for rapidly displaying text in a graphical user interface.

2. Description of Background Art

In many applications it is useful rapidly to render large amounts of text on a display screen. Such applications include, for example, graphical user interfaces wherein the user navigates through a simulated three-dimensional environment. The environment is typically filled with objects and surfaces, often including explanatory text which accompanies or appears to be written on such objects and surfaces. As the user navigates through the environment, the text may move, and change size, orientation, or appearance. In order to maintain the illusion of real-time movement and navigation, it is important that all objects in the three-dimensional environment be rendered quickly to react to the user's movement. Thus, any on-screen text must be able to be displayed quickly at various sizes and orientations while preserving its essential characteristics.

There are many well-known techniques for displaying text on a screen. One such technique involves storage of a bitmap for each character in a character set for a particular font (where a font is defined as a particular typeface, size, and style, such as, for example, 12-point bold Palatino). In such systems, individual characters are displayed on the screen by accessing the bitmap for each desired letter, and turning on or off individual pixels on the screen according to the bitmap. A disadvantage of such a technique is that it requires storing and loading a distinct set of bitmaps for each font, which consumes system resources and can slow down the display of text, particularly if a large number of different fonts are used. In addition, an interpretation engine must usually be provided to read the bitmaps, process them, and render them onto the screen; this process may take a considerable amount of time when a large quantity of text is to be displayed. Display may be even slower if bitmaps must be individually loaded from data storage as needed.

Other known techniques involve defining each character using a type description language such as TrueType®, which describes the character in terms of its component parts, such as for example, a collection of Bezier curves. Such languages permit the shapes of the letters to be preserved when scaled at various sizes, so that a single representation of each letter can be stored in lieu of multiple representations for different sizes. Although such techniques permit text to be described in a relatively small amount of storage space, they still require an interpretation engine to convert the type descriptions into an on-screen representation for display, particularly when rendering is to be performed by modestly-powered conventional personal computers. Such limitations make type description languages unusable for displaying large amounts of text quickly enough for applications such as moving three-dimensional environments.

What is needed is a system and method of displaying text on a screen that permits large amounts of text to be rendered relatively quickly without consuming an excessive amount of system resources.

SUMMARY OF THE INVENTION

In accordance with the present invention, there is provided a system and method of rapidly displaying text. In an initialization mode, fast-running executable functions are developed and stored for the characters to be displayed on-screen. In a run-time mode, these functions are called as needed to display desired characters at particular sizes and orientations. Since the functions are stored in machine-readable executable form, no interpretation engine is needed to run the functions to generated text. Thus, the system is able to display large amounts of on-screen text relatively quickly.

In the initialization mode, an initialization module receives character sets for the particular fonts to be used. As mentioned previously, a font is defined as a particular typeface, size, and style, so that different sizes of the same typeface are described by distinct character sets. The initialization module prints each character in the character set to an area of memory such as a frame buffer. The character is thus represented as a bitmap residing in the frame buffer. The initialization module then develops a sequence of machine instructions that, when executed, will replicate the bitmap. These machine instructions are preferably extremely simple instructions that set particular memory locations to a certain value. The initialization module then performs common sub-expression elimination on the machine instructions to replace selected groups of instructions with higher-level instructions. In particular, the initialization module attempts to identify primitives (such as lines, for example) that can be more efficiently generated by a single machine instruction rather than a sequence of distinct pixel-drawing machine instructions. Where such primitives are identified, the initialization module replaces the sequence of pixel-drawing instructions with the single primitive-drawing instruction, thus reducing the amount of memory space required to store the function.

The initialization module generates an executable function for each character in each character set that will be used by the system. The function may be generated in machine language, or it may be generated in some higher level language (such as C, for example) and compiled into executable machine language. If desired, these functions may be parameterized so that they accept input (such as orientation, for example) that affects certain characteristics of the characters to be generated, though this is not necessary to practicing the invention. The functions are stored in a function library.

In one embodiment, the initialization module selectively generates functions that produce anti-aliased text. This may be done, for example, to improve readability when the size of the font is smaller than a predetermined threshold value. Anti-aliased text drawing functions provide for multiple shades of gray (or some other color) for each pixel to be drawn. To generate such functions, the initialization module prints each character set to the frame buffer at some multiple of normal size, such as for example double size, and the increased resolution of the bitmap is used to derive multiple shades of gray.

When rendering and displaying text on the screen, the system identifies the executable function for each character to be displayed, depending on the particular character and font desired. The system then executes the function, thus rendering the character to the screen without requiring any interpretation engine.

Thus, by generating, storing, and subsequently executing functions for generation of individual characters, the present invention provides the capability of displaying large amounts of text on a screen relatively quickly without consuming an excessive amount of system resources.

DETAILED DESCRIPTION OF THE INVENTION

The present invention is capable of application, for example, in graphics systems where large amounts of text are to be drawn on screen in a limited amount of time. Such requirements occur, for example, when the text constitutes part of a virtual three-dimensional "world" through which a user can navigate. The implementation of such a virtual "world" on a two-dimensional screen often requires repeatedly drawing graphical elements, including text, to different parts of the screen and at different sizes and orientations. In order to preserve the illusion of a consistent three-dimensional environment, the redrawing of elements must occur quickly as the user "moves" around. In addition, there are many other applications in which rapid display of text to a screen is desired.

Hardware Architecture

Figure 1:
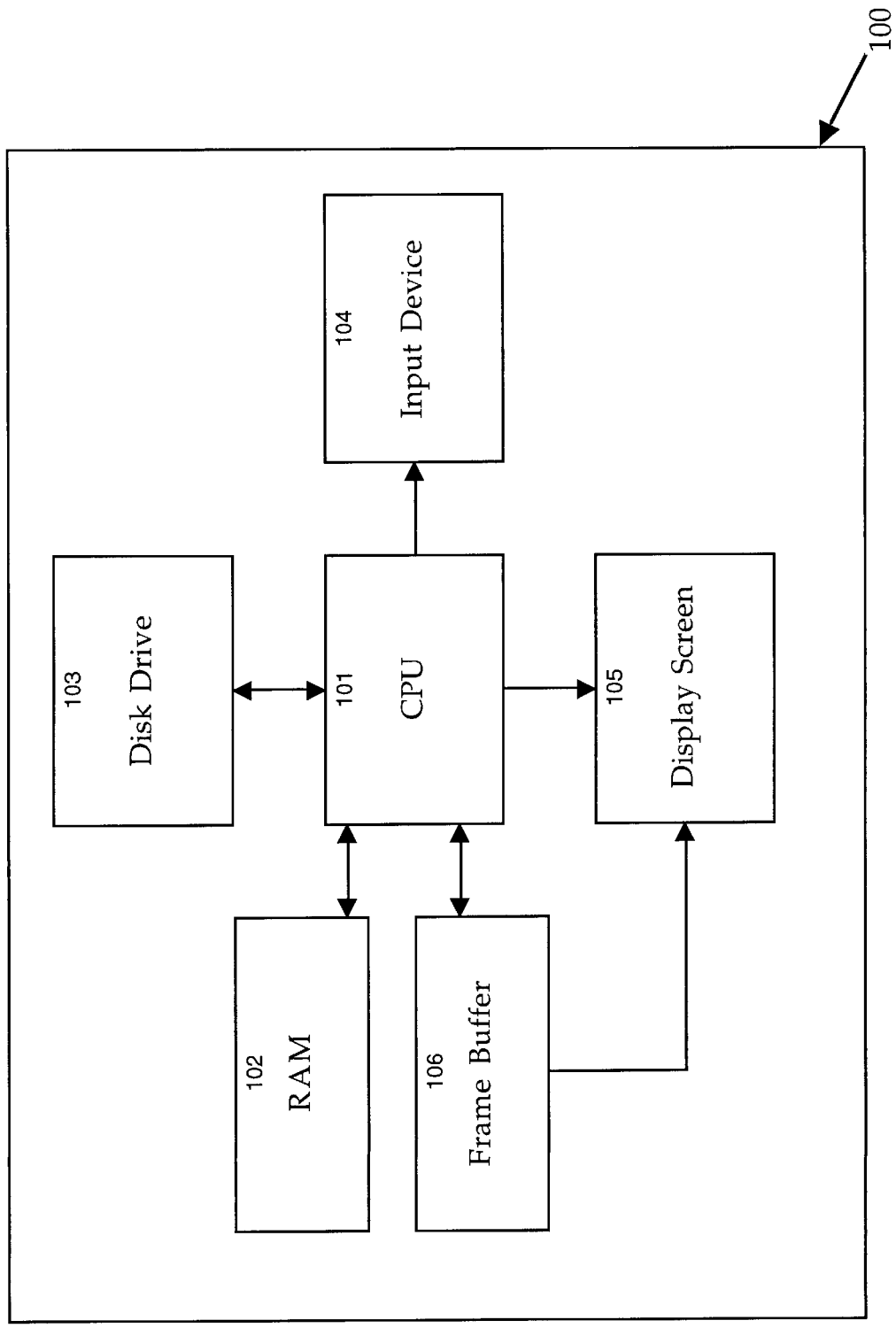
FIG. 1 is a block diagram showing a hardware architecture for an embodiment of the present invention.

Referring now to FIG. 1, there is shown a block diagram of a hardware configuration for practicing the present invention. In one embodiment, the present invention is implemented as software running on a conventional personal computer such as an Apple® Macintosh® computer. Thus, the hardware architecture of system 100 as shown in FIG. 1 may be implemented as a combination of components of such a computer, though other implementations may also be used. Central processing unit (CPU) 101 executes software instructions and interacts with other components to perform the techniques of the present invention. Random-access memory (RAM) 102 stores software instructions to be executed by CPU 101, and may store other data to act as a workspace in the implementation of the present invention. Disk drive 103 provides long-term storage of data and software programs. Input device 104 such as a keyboard and/or mouse facilitates user control of the operation of system 100, including for example navigation through a simulated three-dimensional environment. Frame buffer 106 provides an area of memory that may be used as a workspace and is also used for drawing output prior to its display by display screen 105. Frame buffer 106 in one embodiment is implemented as a portion of RAM 102 and may be specially adapted to the display of video information (video RAM, or VRAM). Display screen 105 is an output device such as a cathode-ray tube for the display of selected contents of frame buffer 106 under the control of CPU 101.

Software Architecture

Figure 2:
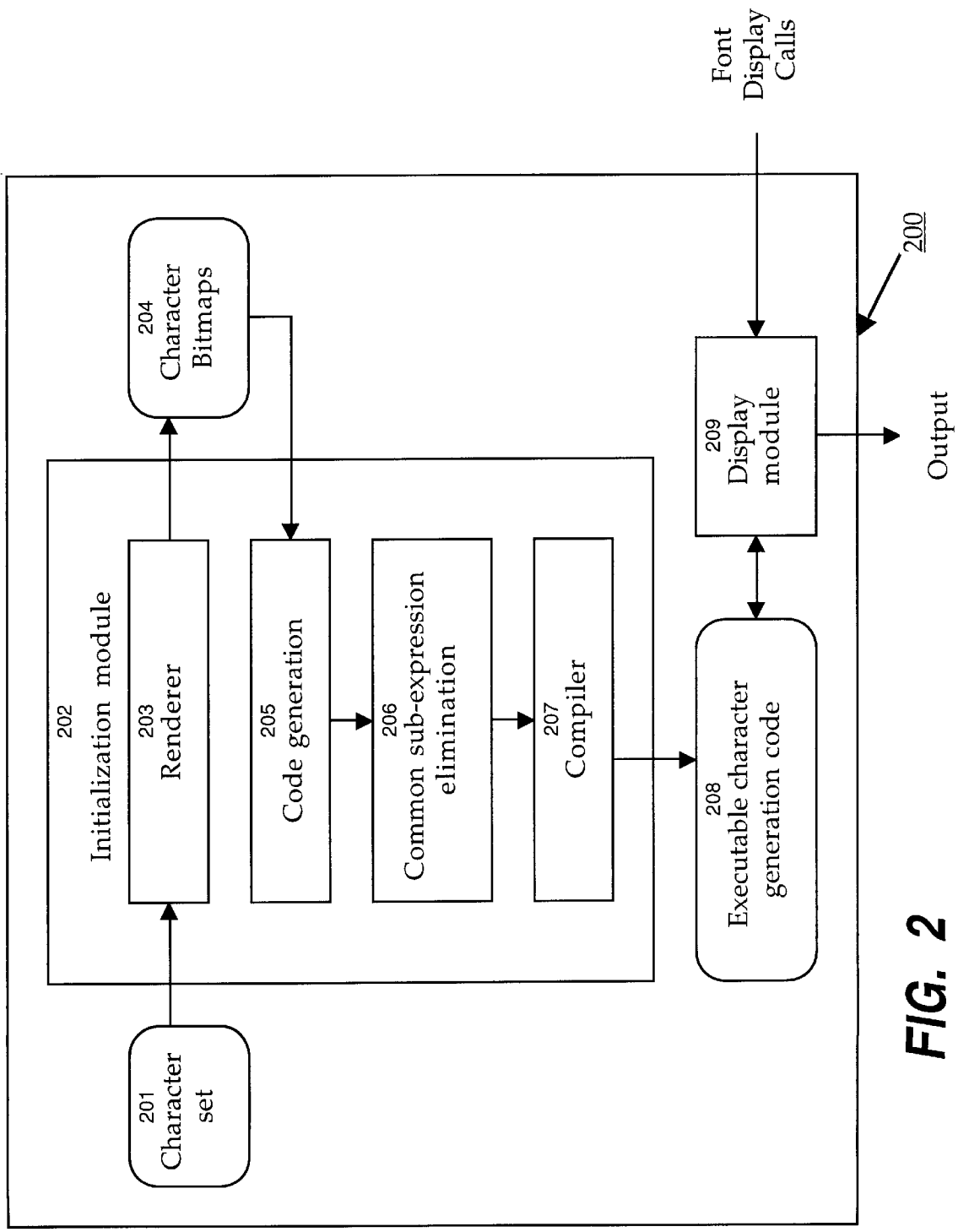
FIG. 2 is a block diagram showing a software architecture for an embodiment of the present invention.

Referring now to FIG. 2, there is shown a block diagram of a software architecture 200 for implementing the present invention. The various components of FIG. 2 represent data and functional modules that may be implemented as software components in a hardware architecture as shown in FIG. 1. The specific hardware implementation shown and described is but one possible embodiment of the present invention, and as will be apparent to those skilled in the art, many combinations and implementations of the functional elements of FIG. 2 may be contemplated that would not depart from the essential characteristics of the present invention as claimed herein.

Initialization module 202 performs the initialization functions of the present invention, which essentially include converting one or more character sets 201 into executable character generation code 208 for later use by display module 209. In one embodiment, the functions performed by initialization module 202 are performed prior to real-time use of system 100 so that time-critical applications employing the present invention are not unduly affected by the initialization steps. Once initialization module 202 has completed its operations, real-time use of system 100 may commence using display module 209 in order to achieve the high-speed display of text on display screen 105.

Initialization module 202 includes renderer 203 which takes as its in-put character set 201. Character set 201 is a collection of text characters having particular characteristics such as typeface, size, and style (which characteristics are collectively referred to as the "font" of the character set). Character set 201 may include a complete set of alphanumeric characters for a particular font, or it may include merely a subset of the alphabet. It may optionally include special characters such as punctuation or other markings. More than one character set 201 may be supplied to renderer 203 depending on the needs of system 100 and the nature of the display that is expected to be produced by display module 209.

Renderer 203 uses character set 201 to generate a set of character bitmaps 204. In one embodiment, character bitmaps 204 are stored in frame buffer 106. Each character bitmap 204 defines a set of pixels within a grid that, when activated, form a shape representing or approximating the shape of one of the characters from character set 201, as will be described in more detail below.

Code generation module 205 uses character bitmaps 204 to generate executable code capable of reproducing one of bitmaps 204 when called. In one embodiment, common sub-expression elimination (CSEE) module 206 optionally replaces selected groups of instructions of executable code generated by code generation module 205 with higher-level instructions to reduce the number of such instructions and thereby reduce the amount of space required to store the code. In one embodiment, the output of CSEE module 206 is executable code represented by machine instructions. In another embodiment, the output of CSEE module 206 is code written in a higher-level language such as C, which is then compiled by compiler 207 to produce executable code. Executable character generation code 208 is stored in RAM 102 or in disk drive 103 for later use by display module 209.

Display module 209 receives font display calls from other components of system 100. In response to these calls, display module 209 runs selected functions from executable character generation code 208 to display text to frame buffer 106 for output and display on display screen 105.

Initialization

Figure 3:
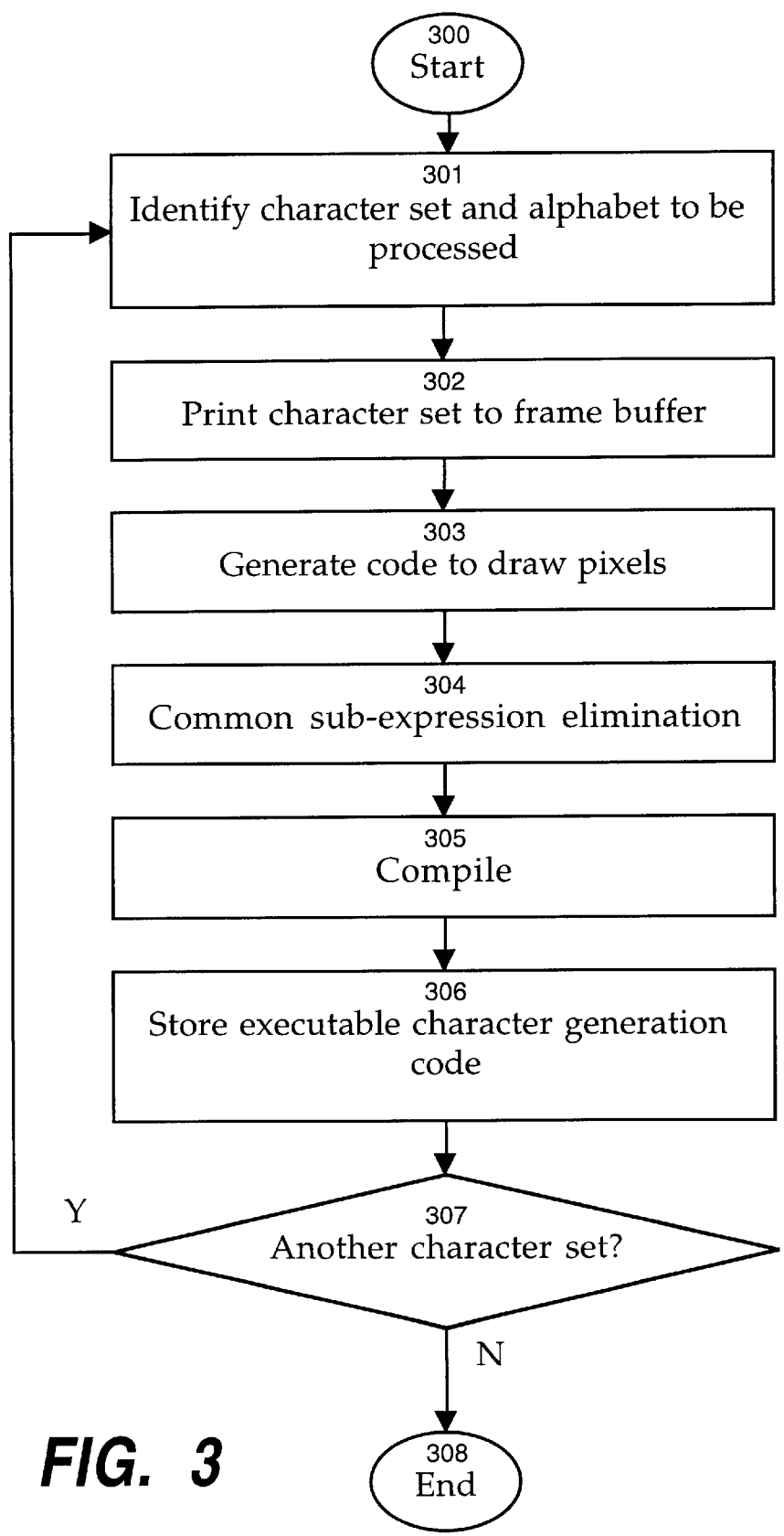
FIG. 3 is a flowchart showing an initialization method according to the present invention.

The particular steps involved in practicing one embodiment of the present invention will now be described in detail. Referring now to FIG. 3, there is shown a flowchart of the operation of one embodiment. Initialization module 202 identifies 301 a character set 201 and alphabet to be processed. In some applications, it may be preferable to process a subset of the entire character set 201, if only that subset is going to be used by display module 209. For example, the particular application may use only uppercase letters, or may exclude punctuation marks. In addition, a particular size and style are specified, along with other relevant parameters as needed. Character set 201 is encoded according to a character definition language, such as for example TrueType® or PostScript®, that is readable and readily converted to a bitmap by techniques known in the art. Typically, character sets are processed for a number of sizes and styles of a particular typeface.

Figure 4:
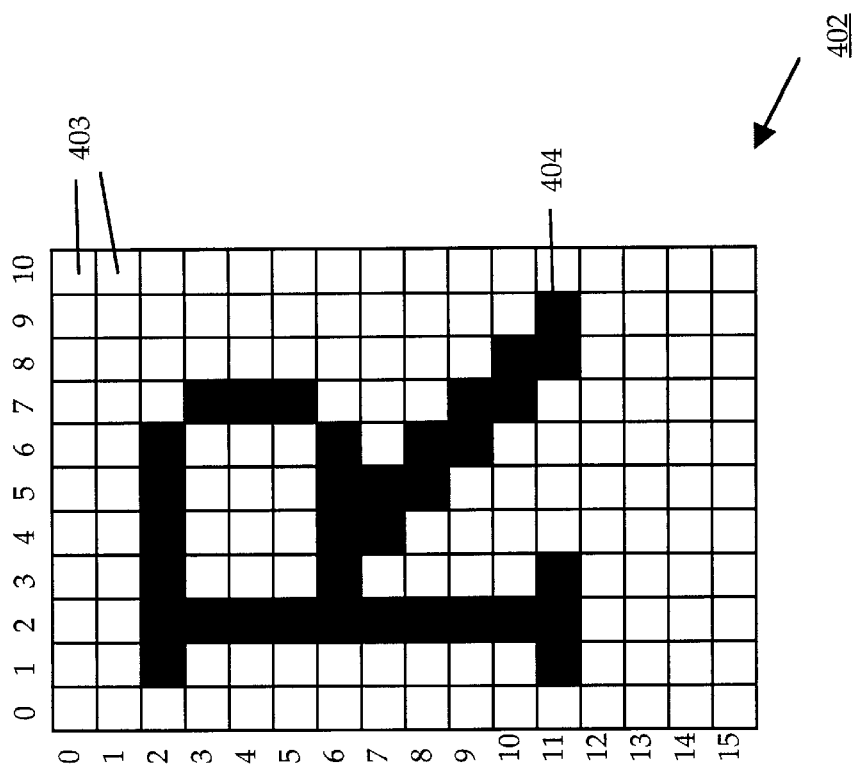
FIG. 4 is an example of a character processed by an initialization module according to the present invention.
Figure 4:
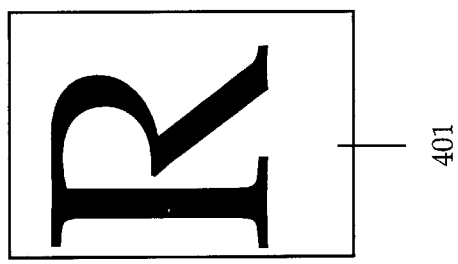

Renderer 203 prints, or "renders" 302 the character set (or subset) to some area of memory such as frame buffer 106. Rendering is performed by applying an interpretation engine as is known in the art to each character in the character set as defined by the character definition language. Where necessary, renderer 203 is supplied whatever parameters, such as size and style, are needed to form a bitmap from the character definitions. Referring now also to FIG. 4, there is shown an example of printing a letter "R" 401 in Palatino at a particular size. Character 401 is supplied to renderer 203 according to a character definition language, along with parameters such as size. Renderer 203 forms bitmap 402 according to the specified size, using rendering techniques that are known in the art. Bitmap 402 includes a grid of pixels 403, some of which are activated as indicated by 404 to form an approximation of the shape of character 401.

Code generation module 205 then generates 303 code to draw pixels 403 as defined in bitmap 402. The code generated by module 205 may take the form of executable object code or it may be in a higher-level language such as C which is later compiled to create executable code. Module 205 scans through bitmap 204 and generates an instruction whenever it detects an activated pixel. Thus, for the example bitmap 404 shown in FIG. 4, module 205 might generate code as follows, wherein drawpixel is a pixel-drawing routine that takes two parameters, including an x and a y value representing the coordinates of the pixel to be drawn:

```
Draw_Palatino_9_R(void *parms) {
    drawPixel(1,2);
    drawPixel(2,2);
    drawPixel(3,2);
    drawPixel(4,2);
    drawPixel(5,2);
    drawPixel(6,2);
    drawPixel(2,3);
    drawPixel(7,3);
    drawPixel(2,4);
    drawPixel(7,4);
    drawPixel(2,5);
    drawPixel(7,5);
    drawPixel(2,6);
    drawPixel(3,6);
    drawPixel(4,6);
    drawPixel(5,6);
```

```
    drawPixel(6,6);
    drawPixel(2,7);
    drawPixel(4,7);
    drawPixel(5,7);
    drawPixel(2,8);
    drawPixel(5,8);
    drawPixel(6,8);
    drawPixel(2,9);
    drawPixel(6,9);
    drawPixel(7,9);
    drawPixel(2,10);
    drawPixel(7,10);
    drawPixel(8,10);
    drawPixel(1,11);
    drawPixel(2,11);
    drawPixel(3,11);
    drawPixel(8,11);
    drawPixel(9,11);
}
```

The above code will generate bitmap 402 as shown in FIG. 4 without requiring any interpretation or other processing. Thus, it is capable of generating the letter "R" considerably more quickly than conventional type generation systems.

In order to reduce the amount of space required to store character generation code as produced by code generation module 205, common sub-expression elimination (CSEE) module 206 may be employed 304 to replace selected groups of lines with higher-level commands. CSEE module 206 looks for patterns in the code where function calls for setting individual pixels can be combined into function calls for drawing higher-level primitives such as lines and other shapes. In one embodiment, CSEE module 206 combines individual pixel function calls into horizontal, vertical, and diagonal line drawing function calls, as will be described in more detail below in connection with FIGS. 8, 9, and 10.

If the code generated in 303 by module 205 is in a higher-level language such as C, compiler 207 compiles 305 the code to derive an executable function for drawing the particular character. Compiler 207 is a conventional C-language or other language compiler as is well known in the art. If the code generated by module 205 is already in executable form, no compiler is needed as executable code 208 is directly generated by module 205. Executable code 208 for the character is stored 306 in RAM 102 or in executable files in disk drive 103 for later access by display module 209. If additional character sets need to be processed 307, initialization module 205 returns to 301.

Figure 7:
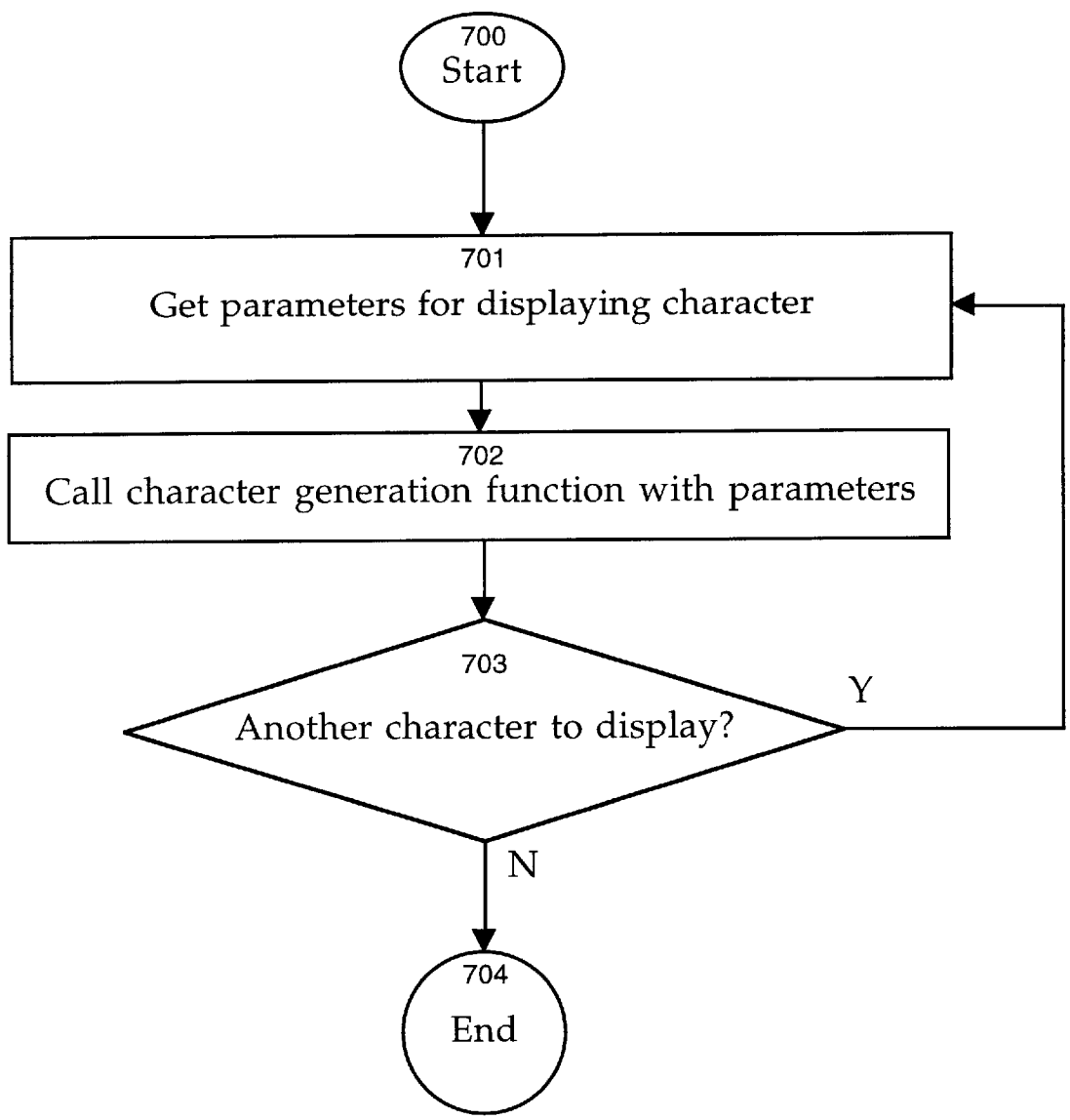
FIG. 7 is a flowchart showing a method of displaying text using functions generated according to the present invention.

After initialization module 202 has generated executable character code 208 for all characters that will be used by system 100, display module 209 calls and executes functions in code 208 in response to font display calls from applications running on system 100. Referring now to FIG. 7, there is shown a flowchart of a method of displaying characters according to the present invention. Whenever the application needs to draw a character on the screen, it calls display module 209. Display module 209 gets 701 parameters from the calling function that specify the particular character to be displayed, along with its typeface, size, style, orientation, and other relevant attributes. Display module 209 calls 702 the appropriate character generation function from executable code 208 using the appropriate parameters if applicable. Execution of the appropriate function results in the character being drawn to frame buffer 106 where it is then shown on display screen 105. If another character is to be displayed 703, display module 209 returns to 701.

CSEE Module 206

Figure 8:
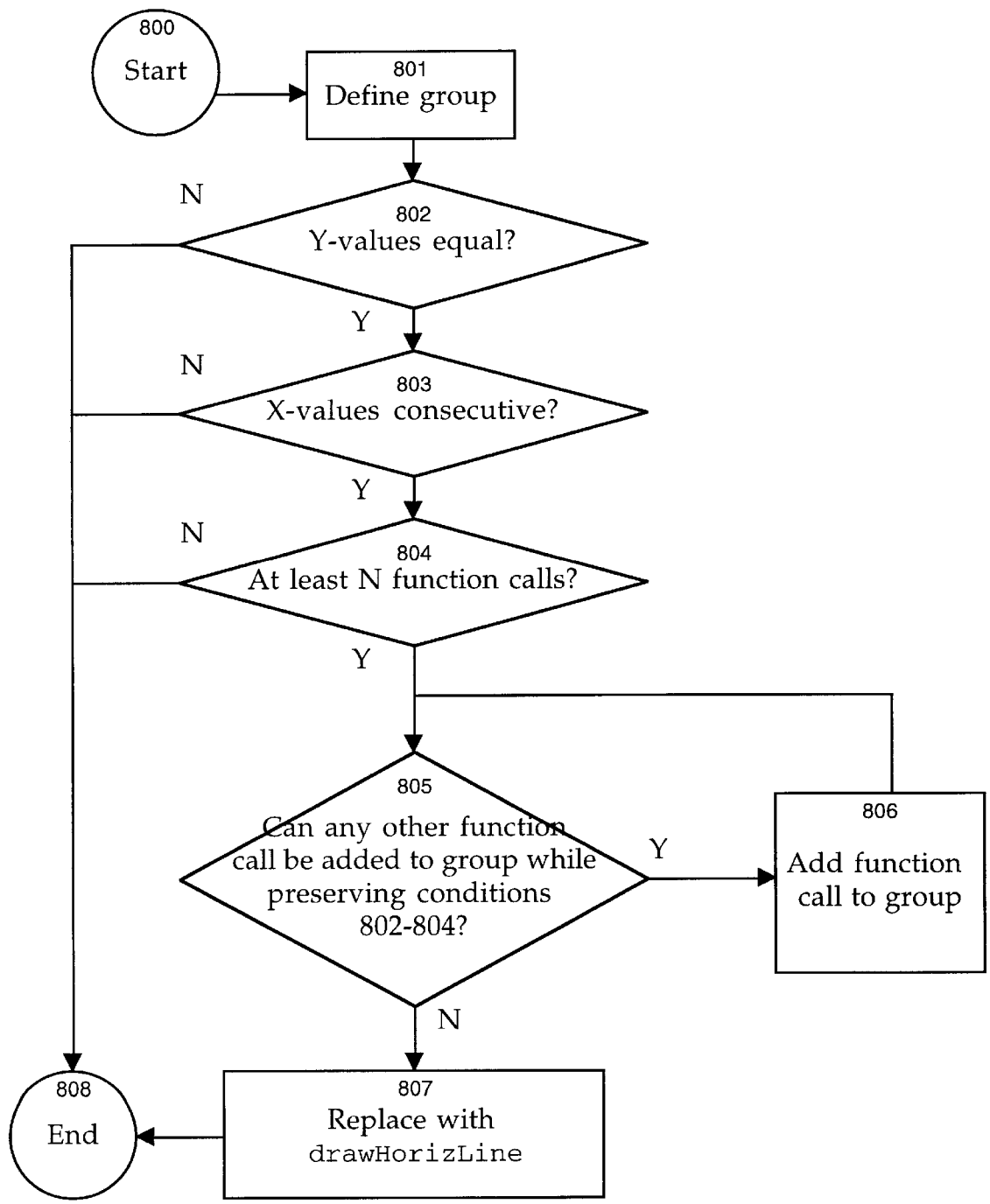
FIG. 8 is a flowchart showing a method of replacing individual pixel-drawing function calls with horizontal line-drawing function calls.

The details of operation of CSEE module 206 will now be described. Referring now to FIG. 8, there is shown a method of scanning for horizontal rows of pixels having at least N consecutive pixels and replacing each such row with a drawHorizLine function call for drawing a horizontal line. CSEE module 206 defines 801 some group of pixel-drawing function calls and determines whether:

- 802) the y-values for all function calls in the group are equal; and
- 803) the x-values for the function calls in the group are consecutive; and
- 804) there are at least N function calls in the group; and
- 805) no other function call in the listing can be added to the group while still preserving conditions 802 to 804.

N may be set at any arbitrary number of pixels, depending on the relative overhead for function calls and the space savings involved in the CSEE process. In one embodiment, N is set to three.

If condition 805 indicates that another function call can be added to the group, the function call is added 806 and condition 805 is checked again. This process is repeated until no other functions can be added to the group. The group of function calls is then replaced 807 with a single drawHorizLine function call. The drawHorizLine function call takes as it parameters an x and y value representing the coordinates of the starting point and a length value representing the length in pixels of the horizontal line to be drawn.

Applying the method of FIG. 8 with N=3 to the code listing shown above results in the following listing:

```
Draw_Palatino_9_R(void *parms) {
    drawHorizLine(1,2,6);
    drawPixel(2,3);
    drawPixel(7,3);
    drawPixel(2,4);
    drawPixel(7,4);
    drawPixel(2,5);
    drawPixel(7,5);
    drawHorizLine(2,6,5);
    drawPixel(2,7);
    drawPixel(4,7);
    drawPixel(5,7);
    drawPixel(2,8);
    drawPixel(5,8);
    drawPixel(6,8);
    drawPixel(2,9);
    drawPixel(6,9);
    drawPixel(7,9);
    drawPixel(2,10);
    drawPixel(7,10)
    drawPixel(8,10);
    drawHorizLine(1,11,3)
    drawPixel(8,11);
    drawPixel(9,11);
}
```

Figure 9:
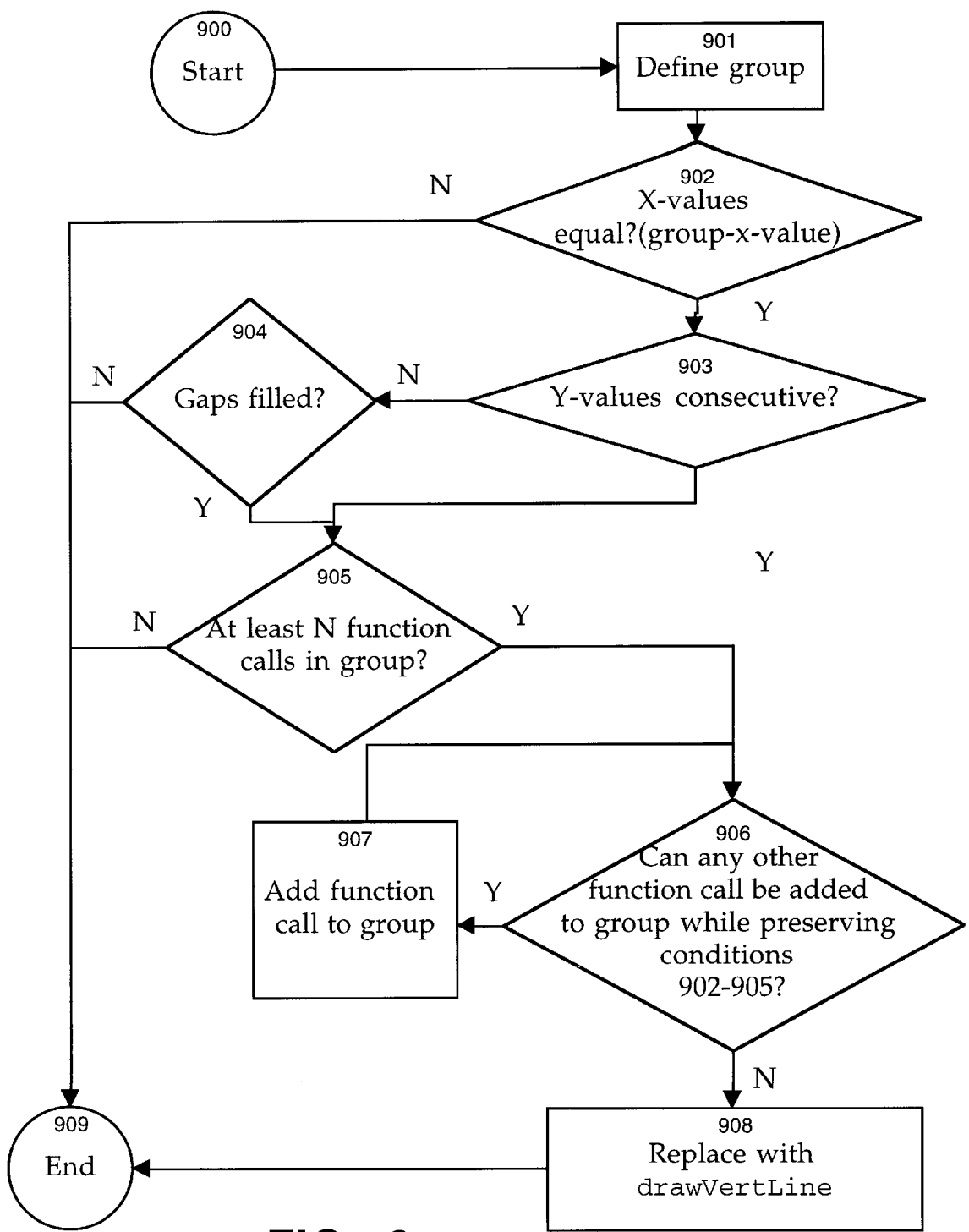
FIG. 9 is a flowchart showing a method of replacing individual pixel-drawing function calls with vertical line-drawing function calls.

Referring now to FIG. 9, there is shown a method of scanning for vertical rows of pixels having at least N consecutive pixels and replacing each such row with a drawvertLine function call. In one embodiment, the steps shown in FIG. 9 are performed after the steps of FIG. 8. CSEE module 206 defines 901 some group of pixel-drawing function calls and determines whether:

- 902) the x-value for all function calls in the group are equal (group-x-value); and
- 903) the y-values for the function calls in the group are consecutive, or
- 904) any gaps in y-values are filled in by drawHorizLine function calls having:
  - a) a y-value corresponding to the y-value of the gap; and
  - b) an x-value less than or equal to group-x-value; and

- c) a length such that (x-value+length) is greater than or equal to group-x-value;
- 905) there are at least N function calls in the group (not including drawVertLine function calls); and
- 906) no other function call in the listing can be added to the group while still preserving conditions 902 to 905.

N may be set at any arbitrary number of pixels, depending on the relative overhead for function calls and the space savings involved in the CSEE process. In one embodiment, N is set to three.

If condition 906 indicates that another function call can be added to the group, the function call is added 907 and condition 906 is checked again. This process is repeated until no other functions can be added to the group. The group of function calls is then replaced 908 with a single drawVertLine function call. The drawVertLine function call takes as it parameters an x and y value representing the coordinates of the starting point and a length value representing the length in pixels of the vertical line to be drawn.

Applying the method of FIG. 9 with N=3 to the code listing shown above results in the following listing:

```
Draw_Palatino_9_R(void *parms) {
    drawHorizLine(1,2,6);
    drawVertLine(2,3,8);
    drawVertLine(7,3,3);
    drawHorizLine(2,6,5);
    drawPixel(4,7);
    drawPixel(5,7);
    drawPixel(5,8);
    drawPixel(6,8);
    drawPixel(6,9);
    drawPixel(7,9);
    drawPixel(7,10);
    drawPixel(8,10);
    drawHorizLine(1,11,3)
    drawPixel(8,11);
    drawPixel(9,11);
}
```

Figure 10:
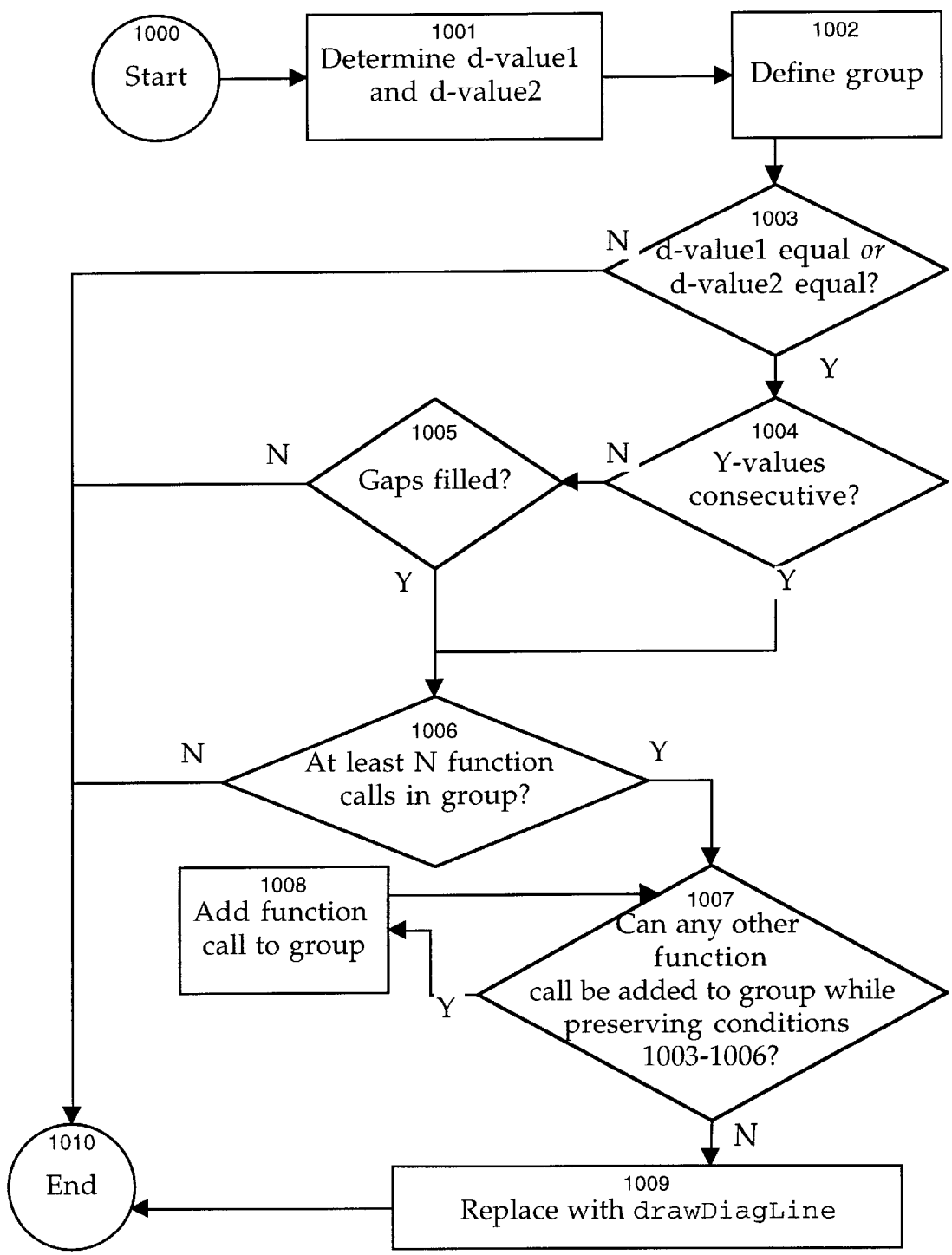
FIG. 10 is a flowchart showing a method of replacing individual pixel-drawing function calls with diagonal line-drawing function calls.

Referring now to FIG. 10, there is shown a method of scanning for diagonal rows of pixels having at least N consecutive pixels at a 45-degree angle and replacing each such row with a drawDiagLine function call for drawing a diagonal line. In one embodiment, the steps shown in FIG. 10 are performed after the steps of FIG. 8 and FIG. 9. For each pixel-drawing function call in the listing, CSEE module 206 determines 1001 values for d-value$_1$ and d-value$_2$ as follows:

$$\text{d-value}_1 = \text{y-value} - \text{x-value} \quad \text{(Eq. 1)}$$

and $$\text{d-value}_2 = \text{y-value} + \text{x-value} \quad \text{(Eq. 2)}$$

CSEE module 206 defines 1002 some group of pixel-drawing function calls and determines whether:

- 1003) d-value$_1$ for all function calls of the group are equal (negative slope), or d-value$_2$ for all function calls of the group are equal (positive slope); and
- 1004) the y-values for the function calls in the group are consecutive, or
- 1005) any gaps in y-values are filled in by drawHorizLine or drawVertLine function calls;
- 1006) there are at least N function calls in the group (not including drawVertLine and drawHorizLine function calls); and
- 1007) no other function call in the listing can be added to the group while still preserving conditions 1003 to 1006.

N may be set at any arbitrary number of pixels, depending on the relative overhead for function calls and the space savings involved in the CSEE process. In one embodiment, N is set to three.

If condition 1007 indicates that another function call can be added to the group, the function call is added 1008 and condition 1007 is checked again. This process is repeated until no other functions can be added to the group. The group of function calls is then replaced 1009 with a single draw-DiagLine function call. The drawDiagLine function call takes as it parameters an x and y value representing the coordinates of the starting point, a length value representing the length in pixels of the diagonal line to be drawn, and a binary flag indicating if the slope of the line is positive or negative.

Applying the method of FIG. 10 with N=3 to the code listing shown above results in the following listing:

```
Draw_Palatino_9_R(void *parms) {
    drawHorizLine(1,2,6);
    drawVertLine(2,3,8);
    drawVertLine(7,3,3);
    drawHorizLine(2,6,5);
    drawDiagLine(4,7,5,NEGATIVE);
    drawDiagLine(5,7,5,NEGATIVE);
    drawHorizLine(1,11,3);
}
```

In one embodiment, CSEE module 206 may optionally perform an additional step wherein duplicate pixels are eliminated.

In other embodiments, CSEE module 206 scans for diagonal lines of arbitrary angles. In yet other embodiments, it uses drawing function calls for higher-level primitives such as curves, circles, rectangles, and the like. Furthermore, the order of scanning described above may be varied to provide optimal results for a given application. For example, it may be advantageous in certain applications to scan for diagonal lines before scanning for horizontal or vertical lines.

Anti-aliasing

In one embodiment of the present invention, initialization module 202 generates executable code 208 for drawing anti-aliased fonts. Anti-aliasing is a known technique for reducing or eliminating jagged edges in the display of graphic elements such as characters on a display screen. In one embodiment, anti-aliasing is implemented in the present invention by providing functions for drawing pixels at differing levels of intensity. In one embodiment, anti-aliasing is performed when the point size of a character in a character set falls below some threshold value, such as, for example 12 points. Since anti-aliasing is most advantageous when relatively small sizes of characters are to be displayed, in one embodiment it is not performed for larger sizes of characters.

Figure 5:
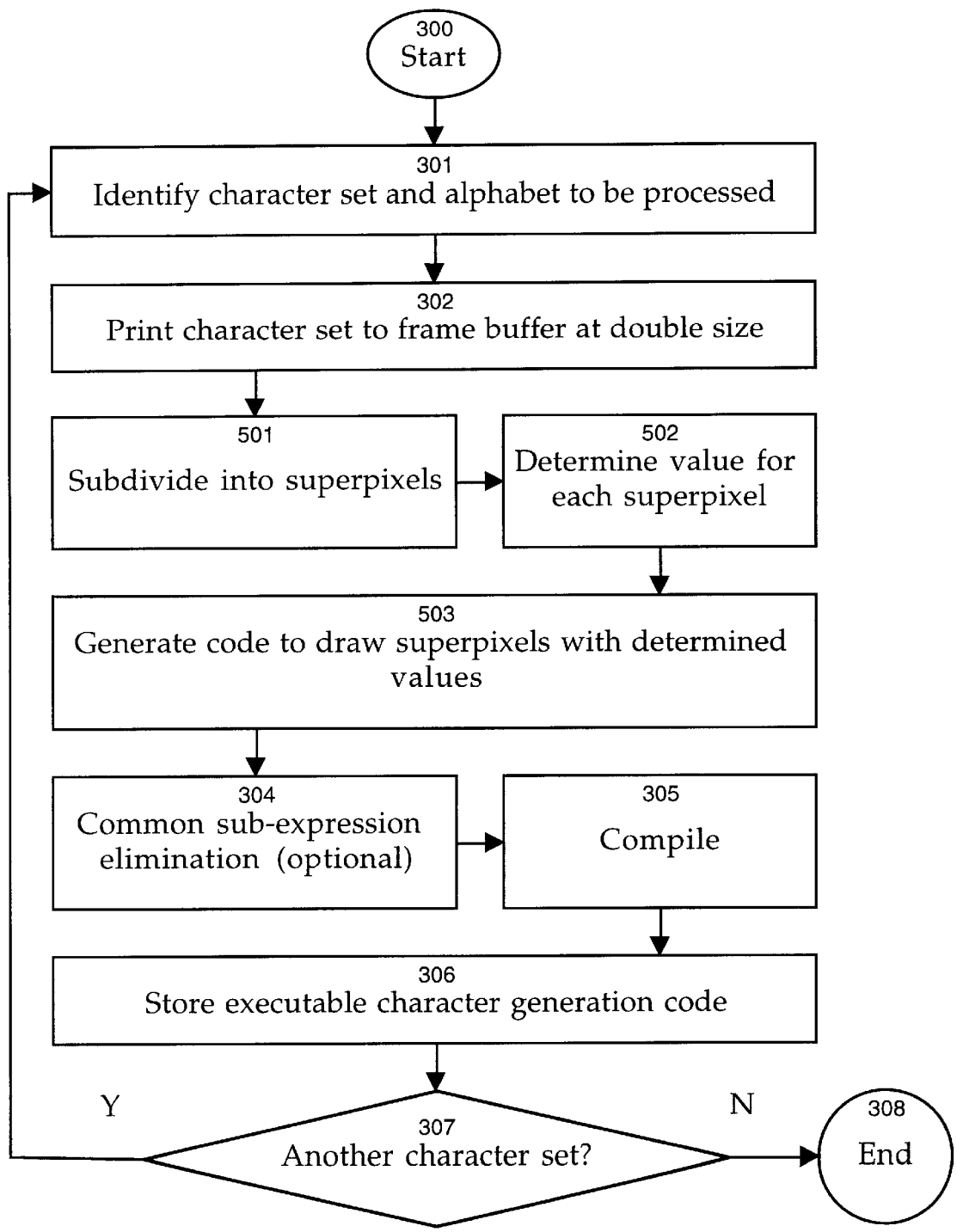
FIG. 5 is a flowchart showing a method of generating functions for anti-aliased text according to the present invention.

Referring now to FIG. 5, there is shown a flowchart of the operation of one embodiment of the present invention for processing a character set using anti-aliasing techniques. In one embodiment, the steps of FIG. 5 are performed if the character set has a size of 11 points or smaller, while the previously-described steps of FIG. 3 are performed if the character set has a size of 12 points or larger.

Figures 6A, 6B, 6C:
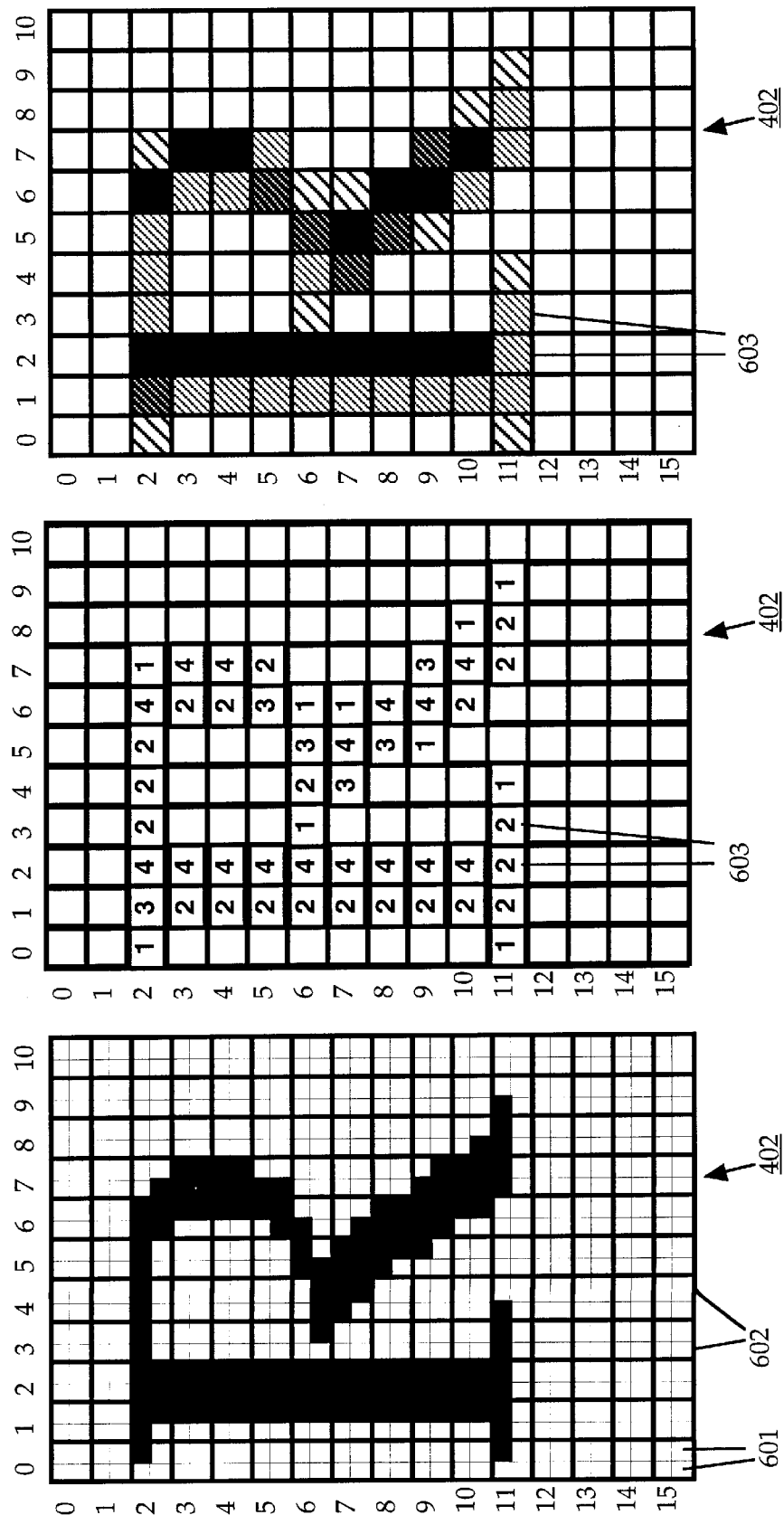
FIGS. 6A, 6B, and 6C show an example of a character processed by an initialization module to generating anti-aliased text according to the present invention.

As described previously, initialization module 202 identifies 301 a character set 201 and alphabet to be processed. Renderer 203 prints or "renders" 302 the character set to a frame buffer 106 or other area of memory. When generating anti-aliasing functions, renderer 203 renders 302 the character set at some larger size than normal, for example double-size, in order to obtain increased resolution in the rendered characters. Referring now also to FIG. 6A, there is shown an example of printing a letter "R" in Palatino at double size. Renderer 403 forms bitmap 402 at double size using rendering techniques that are known in the art. Bitmap 402 includes a grid of pixels 601. Bitmap 402 is subdivided 501 into a plurality of 2×2 "superpixels" 602, each containing four pixels 601.

A value is determined 502 for each superpixel 602 based on the number of pixels 601 that are activated in that superpixel 602. The value ranges from zero to four. Referring now to FIG. 6B, there is shown an example of bitmap 402 with values 603 indicated for superpixels 602. Code generation module 205 then generates 503 code to draw superpixels 602 as defined in bitmap 402, using successively darker shades for successively higher superpixel values. Thus, while a superpixel 602 having a value of 4 might be drawn as a black superpixel, one having a value of 2 would be drawn as a medium-gray superpixel. The code generated by module 205 may take the form of executable object code or it may be in a higher-level language such as C which is later compiled to create executable code. Module 205 scans through bitmap 204 and generates an instruction whenever it detects an activated pixel. In the code generated for anti-aliased text, drawGrayPixel is used as a pixel-drawing routine; it takes three parameters: an x and a y value representing the coordinates of the pixel to be drawn, and a value representing the gray-level of the pixel. Coordinates are expressed in terms of super-pixels 602, so that the final pixel-drawing routine draws characters at the correct original size rather than the double-size of FIG. 6A. Thus, for the example bitmap 402 shown in FIG. 6A, module 205 might generate code as follows:

```
Draw Palatino_9_R_AA(void *parms) {
    drawGrayPixel(0,2,1);
    drawGrayPixel(1,2,3);
    drawGrayPixel(2,2,4);
    drawGrayPixel(3,2,2);
    drawGrayPixel(4,2,2);
    drawGrayPixel(5,2,2);
    drawGrayPixel(6,2,4);
    drawGrayPixel(7,2,1);
    drawGrayPixel(1,3,2);
    drawGrayPixel(2,3,4);
    drawGrayPixel(6,3,2);
    drawGrayPixel(7,3,4);
    drawGrayPixel(1,4,2);
    drawGrayPixel(2,4,4);
    drawGrayPixel(6,4,2);
    drawGrayPixel(7,4,4);
    drawGrayPixel(1,5,2);
    drawGrayPixel(2,5,4);
    drawGrayPixel(6,5,3);
    drawGrayPixel(7,5,2);
    drawGrayPixel(1,6,2);
    drawGrayPixel(2,6,4);
    drawGrayPixel(3,6,1);
    drawGrayPixel(4,6,2);
    drawGrayPixel(5,6,3);
    drawGrayPixel(6,6,1);
    drawGrayPixel(1,7,2);
    drawGrayPixel(2,7,4);
    drawGrayPixel(4,7,3);
    drawGrayPixel(5,7,4);
    drawGrayPixel(6,7,1);
    drawGrayPixel(1,8,2);
    drawGrayPixel(2,8,4);
    drawGrayPixel(5,8,3);
    drawGrayPixel(6,8,4);
    drawGrayPixel(1,9,2);
    drawGrayPixel(2,9,4);
    drawGrayPixel(5,9,1);
    drawGrayPixel(6,9,4);
```

-continued

```
        drawGrayPixel(7,9,3);
        drawGrayPixel(1,10,2);
        drawGrayPixel(2,10,4);
        drawGrayPixel(6,10,2);
        drawGrayPixel(7,10,4);
        drawGrayPixel(8,10,1);
        drawGrayPixel(0,11,1);
        drawGrayPixel(1,11,2);
        drawGrayPixel(2,11,2);
        drawGrayPixel(3,11,2);
        drawGrayPixel(4,11,1);
        drawGrayPixel(7,11,2);
        drawGrayPixel(8,11,2);
        drawGrayPixel(9,11,1);
        }
```

The above code will generate bitmap 402 as shown in FIG. 6C without requiring any interpretation or other processing. Thus, it is capable of generating the letter "R" in anti-aliased form considerably more quickly than conventional type generation systems.

If desired, CSEE module 206 may be employed to perform 304 common sub-expression elimination as described above in connection with FIG. 4. However, it may be advantageous in some applications to omit CSEE 304 in connection with anti-aliased text, since the number of potential consolidations into line-drawing function calls is reduced due to the various levels of gray that are involved in drawing the character. Thus, the additional overhead imposed by line-drawing functions with variable gray levels may not be offset by the drawing time saved by such consolidation.

Module 206 then compiles 305 and stores 306 the character generation functions as previously described, and returns to 301 if any other character sets need to be processed 307.

The above-described method for generating anti-aliased character generation functions is merely one example of an embodiment of the preferred invention. In other embodiments, other color levels may be used, the resolution of bitmap 402 may be reduced or enlarged, and other techniques of generating anti-aliased drawing functions may be employed. Anti-aliased character generation functions are executed in the same manner as other character generation functions, as described above in connection with FIG. 7.

The above description provides merely exemplary embodiments for practicing the present invention. Those skilled in the art will recognize that other embodiments are possible without departing from the spirit or essential elements of the invention claimed herein.

What is claimed is:

1. A system for displaying text on an output device, comprising:
an initialization module for accepting at least one character set comprising characters having characteristics, and generating executable code for drawing each character according to the characteristics, the generated executable code being directly executable without compilation;
a storage device coupled to the initialization module for storing the generated executable code;
an output device; and
a display module coupled to the storage device and to the output device, for selectively executing the stored executable code to display characters on the output device.

2. A system for generating executable code for drawing characters in a character set, comprising:
a renderer for interpreting encoded character specifications and drawing a character to create a bitmap;
a code generation module for reading the created bitmap to generate executable code containing a sequence of software instructions for displaying the character represented by the bitmap, the generated executable code being directly executable without compilation; and
a storage device, coupled to the code generation module, for storing the generated executable code.

3. The system of claim 2, wherein each software instruction comprises a pixel-drawing function call for drawing a pixel on an output device.

4. The system of claim 3, further comprising a common sub-expression elimination module coupled to the code generation module for selectively replacing at least two pixel-drawing function calls with a function call for drawing a primitive.

5. The system of claim 4, wherein the function call for drawing a primitive comprises a line-drawing function call.

6. The system of claim 2, wherein the code generation module comprises a source code generation module for generating a function represented as source code, and a compiler coupled to the source code generation module for compiling the source code to generate executable code.

7. The system of claim 2, wherein the code generation module selectively generates executable code containing a sequence of software instructions for displaying in anti-aliased form the character represented by the bitmap.

8. A system for displaying text on an output device, comprising:
an initialization module comprising:
a renderer for interpreting encoded character specifications and drawing a character to create a bitmap;
a code generation module for reading the created bitmap to generate a sequence of pixel-drawing function calls for displaying the character represented by the bitmap;
a common sub-expression elimination module coupled to the code generation module for selectively replacing at least two pixel-drawing function calls with a line-drawing function call;
a compiler coupled to the common sub-expression elimination module for compiling the function calls to generate executable code, the generated executable code being directly executable without compilation;
a storage device coupled to the initialization module for storing the generated executable code;
an output device; and
a display module coupled to the storage device and to the output device, for selectively executing the stored executable code to display characters on the output device.

9. A computer-implemented method of displaying text on an output device, comprising:
a) accepting at least one character set comprising characters having characteristics;
b) generating executable code for drawing each character according to the characteristics, the generated executable code being directly executable without compilation;
c) storing the generated executable code; and
d) selectively executing the stored executable code to display characters on the output device.

10. A computer-implemented method of generating executable code for drawing characters in a character set, comprising:

a) receiving encoded specifications for a character;
b) interpreting the encoded specifications to draw the character as a bitmap;
c) scanning the bitmap to generate executable code containing a sequence of software instructions for displaying the character represented by the bitmap, the generated executable code being directly executable without compilation and
d) storing the generated executable code.

11. The method of claim 10, wherein c) comprises:
c.1) scanning, the bitmap to generate source code; and
c.2) compiling the source code to generate executable code.

12. The method of claim 10, wherein c) comprises scanning the bitmap to generate a plurality of software instructions containing pixel-drawing function calls.

13. The method of claim 10, wherein c) comprises:
c.1) scanning the bitmap to generate a plurality of software instructions containing pixel-drawing function calls; and
c.2) selectively replacing at least two pixel-drawing function calls with a function call for drawing a primitive.

14. The method of claim 13, wherein c.1) comprises selectively replacing at least two pixel-drawing function calls with a line-drawing function call.

15. The method of claim 13, wherein c.1) comprises:
c.1.1) selectively replacing at least two pixel-drawing function calls with a horizontal line-drawing function call;
c.1.2) selectively replacing at least two pixel-drawing function calls with a vertical line-drawing function call; and
c.1.3) selectively replacing at least two pixel-drawing function calls with a diagonal line-drawing function call.

16. The method of claim 10, wherein c) comprises scanning the bitmap to generate a plurality of software instructions selectively containing variable-intensity pixel-drawing function calls for drawing anti-aliased text.

17. The method of claim 10, wherein c) comprises:
c.1) determining the point size of the character;
c.2) responsive to the determined point size falling below a predefined threshold value, scanning the bitmap to generate a plurality of software instructions containing variable-intensity pixel-drawing function calls for drawing anti-aliased text; and
c.3) responsive to the determined point size not falling below the predefined threshold value, scanning the bitmap to generate a plurality of software instructions containing pixel-drawing function calls for drawing non-anti-aliased text.

18. A computer-implemented method of displaying text on an output device, comprising:
a) accepting at least one character set comprising characters having characteristics;
b) determining the point size of the character set;
c) for each of a plurality of characters in the character set:
c.1) receiving encoded specifications for the character;
c.2) responsive to the point size of the character set being smaller than a predetermined point size:
c.2.1) interpreting the encoded specifications to draw the character as a bitmap at increased resolution; and
c.2.2) scanning the bitmap to generate a plurality of software instructions containing variable-intensity pixel-drawing function calls for displaying the character represented by the bitmap in anti-aliased form;
c.3) responsive to the point size of the character set not being smaller than the predetermined point size:
c.3.1) interpreting the encoded specifications to draw the character as a bitmap at standard resolution;
c.3.2) scanning the bitmap to generate a plurality of software instructions containing pixel-drawing function calls for displaying the character represented by the bitmap in non-anti-aliased form; and
c.3.3) selectively replacing at least two pixel-drawing function calls with a line-drawing function call;
c.4) compiling the source code to generate executable code, the generated executable code being directly executable without compilation; and
c.5) storing the generated executable code; and
d) selectively executing the stored executable code to display characters on the output device.

19. A computer-implemented method of displaying text on an output device, comprising:
a) providing executable code for rendering at least one character in a character set comprising a plurality of characters, each character having characteristics, the executable code being directly executable without compilation;
b) identifying for display one of the characters in the character set;
c) determining characteristics for display of the identified character; and
d) executing the executable code using the determined characteristics to display the identified character on an output device.

20. A computer-implemented system for displaying text on an output device, comprising:
input means for accepting at least one character set comprising characters having characteristics;
executable code generation means, coupled to the input means, for generating executable code for drawing each character according to the characteristics, the generated executable code being directly executable without compilation;
storage means, coupled to the executable code generation means, for storing the generated executable code; and
execution means, coupled to the storage means, for selectively executing the stored executable code to display characters on the output device.

21. A computer-implemented system for generating executable code for drawing characters in a character set, comprising:
input means for receiving encoded specifications for a character;
interpretation means, coupled to the input means, for interpreting the encoded specifications to draw the character as a bitmap;
scanning means, coupled to the interpretation means, for scanning the bitmap to generate executable code containing a sequence of software instructions for displaying the character represented by the bitmap, the generated executable code being directly executable without compilation; and
storage means, coupled to the scanning means, for storing the generated executable code.

22. The system of claim 21, wherein the scanning means comprises:

source code generation means, for scanning the bitmap to generate source code; and compiling means, coupled to the source code generation means, for compiling the source code to generate executable code.

23. The system of claim 21, wherein the scanning means comprises:

scanning means, for scanning the bitmap to generate a plurality of software instructions containing pixel-drawing function calls.

24. The system of claim 21, wherein the scanning means comprises:

software generation means for scanning the bitmap to generate a plurality of software instructions containing pixel-drawing function calls; and function call generation means, coupled to the software generation means, for selectively replacing at least two pixel-drawing function calls with a function call for drawing a primitive.

25. The system of claim 24, wherein the software generation means comprises line-drawing function call means, for selectively replacing at least two pixel-drawing function calls with a line-drawing function call.

26. The system of claim 24, wherein the software generation means comprises:

horizontal line-drawing function call means, for selectively replacing at least two pixel-drawing function calls with a horizontal line-drawing function call;

vertical line-drawing function call means, for selectively replacing at least two pixel-drawing function calls with a vertical line-drawing function call; and diagonal line-drawing function call means, for selectively replacing at least two pixel-drawing function calls with a diagonal line-drawing function call.

27. The system of claim 21, wherein the scanning means comprises software generation means, for scanning the bitmap to generate a plurality of software instructions selectively containing variable-intensity pixel-drawing function calls for drawing anti-aliased text.

28. The system of claim 21, wherein the scanning means comprises:

point size determination means, for determining the point size of the character;

anti-aliased text software generation means, coupled to the point size determination means, for, responsive to the determined point size falling below a predefined threshold value, scanning the bitmap to generate a plurality of software instructions containing variable-intensity pixel-drawing function calls for drawing anti-aliased text; and non-anti-aliased text software generation means, coupled to the point size determination means, for, responsive to the determined point size not falling below the predefined threshold value, scanning the bitmap to generate a plurality of software instructions containing pixel-drawing function calls for drawing non-anti-aliased text.

29. A computer-implemented system for displaying text on an output device, comprising:

input means for accepting at least one character set comprising characters having characteristics;

point size determination means, coupled to the input means, for determining the point size of the character set;

executable code generation means, coupled to the input means, for, for each of a plurality of characters in the character set:

receiving encoded specifications for the character;

responsive to the point size of the character set being smaller than a predetermined point size:

interpreting the encoded specifications to draw the character as a bitmap at increased resolution; and scanning the bitmap to generate a plurality of software instructions containing variable-intensity pixel-drawing function calls for displaying the character represented by the bitmap in anti-aliased form;

responsive to the point size of the character set not being smaller than the predetermined point size:

interpreting the encoded specifications to draw the character as a bitmap at standard resolution;

scanning the bitmap to generate a plurality of software instructions containing pixel-drawing function calls for displaying the character represented by the bitmap in non-anti-aliased form; and selectively replacing at least two pixel-drawing function calls with a line-drawing function call; and compiling the source code to generate executable code, the generated executable code being directly executable without compilation;

storage means, coupled to the executable code generation means, for storing the generated executable code; and execution means, coupled to the storage means, for selectively executing the stored executable code to display characters on the output device.

30. A computer-implemented system for displaying text on an output device, comprising:

executable code means, for providing executable code for rendering at least one character in a character set comprising a plurality of characters, each character having characteristics, the executable code being directly executable without compilation;

identification means, coupled to the executable code means, for identifying for display one of the characters in the character set;

characteristics determination means, coupled to the identification means, for determining characteristics for display of the identified character; and execution means, coupled to the executable code means, for executing the executable code using the determined characteristics to display the identified character on an output device.

31. A computer program product comprising a computer-usable medium having computer-readable code embodied therein for displaying text on an output device, comprising:

computer-readable program code devices configured to cause a computer to accept at least one character set comprising characters having characteristics;

computer-readable program code devices configured to cause a computer to generate executable code for drawing each character according to the characteristics, the generated executable code being directly executable without compilation;

computer-readable program code devices configured to cause a computer to store the generated executable code; and computer-readable program code devices configured to cause a computer to selectively execute the stored executable code to display characters on the output device.

32. A computer program product comprising a computer-usable medium having computer-readable code embodied therein for generating executable code for drawing characters in a character set, comprising:

computer-readable program code devices configured to cause a computer to receive encoded specifications for a character;

computer-readable program code devices configured to cause a computer to interpret the encoded specifications to draw the character as a bitmap;

computer-readable program code devices configured to cause a computer to scan the bitmap to generate executable code containing a sequence of software instructions for displaying the character represented by the bitmap, the generated executable code being directly executable without compilation; and computer-readable program code devices configured to cause a computer to store the generated executable code.

33. The computer program product of claim 32, wherein the computer-readable program code devices configured to cause a computer to scan the bitmap comprise:

computer-readable program code devices configured to cause a computer to scan the bitmap to generate source code; and computer-readable program code devices configured to cause a computer to compile the source code to generate executable code.

34. The computer program product of claim 32, wherein the computer-readable program code devices configured to cause a computer to scan the bitmap comprise:

computer-readable program code devices configured to cause a computer to scan the bitmap to generate a plurality of software instructions containing pixel-drawing function calls.

35. The computer program product of claim 32, wherein the computer-readable program code devices configured to cause a computer to scan the bitmap comprise:

computer-readable program code devices configured to cause a computer to scan the bitmap to generate a plurality of software instructions containing pixel-drawing function calls; and computer-readable program code devices configured to cause a computer to selectively replace at least two pixel-drawing function calls with a function call for drawing a primitive.

36. The computer program product of claim 35, wherein the computer-readable program code devices configured to cause a computer to scan the bitmap to generate a plurality of software instructions containing pixel-drawing function calls comprise:

computer-readable program code devices configured to cause a computer to selectively replace at least two pixel-drawing function calls with a line-drawing function call.

37. The computer program product of claim 35, wherein the computer-readable program code devices configured to cause a computer to scan the bitmap to generate a plurality of software instructions containing pixel-drawing function calls comprise:

computer-readable program code devices configured to cause a computer to selectively replace at least two pixel-drawing function calls with a horizontal line-drawing function call;

computer-readable program code devices configured to cause a computer to selectively replace at least two pixel-drawing function calls with a vertical line-drawing function call; and computer-readable program code devices configured to cause a computer to selectively replace at least two pixel-drawing function calls with a diagonal line-drawing function call.

38. The computer program product of claim 32, wherein the computer-readable program code devices configured to cause a computer to scan the bitmap comprise:

computer-readable program code devices configured to cause a computer to scan the bitmap to generate a plurality of software instructions selectively containing variable-intensity pixel-drawing function calls for drawing anti-aliased text.

39. The computer program product of claim 32, wherein the computer-readable program code devices configured to cause a computer to scan the bitmap comprise:

computer-readable program code devices configured to cause a computer to determine the point size of the character;

computer-readable program code devices configured to cause a computer to, responsive to the determined point size falling below a predefined threshold value, scan the bitmap to generate a plurality of software instructions containing variable-intensity pixel-drawing function calls for drawing anti-aliased text; and computer-readable program code devices configured to cause a computer to, responsive to the determined point size not falling below the predefined threshold value, scan the bitmap to generate a plurality of software instructions containing pixel-drawing function calls for drawing non-anti-aliased text.

40. A computer program product comprising a computer-usable medium having computer-readable code embodied therein for displaying text on an output device, comprising:

computer-readable program code devices configured to cause a computer to accept at least one character set comprising characters having characteristics;

computer-readable program code devices configured to cause a computer to determine the point size of the character set;

computer-readable program code devices configured to cause a computer to, for each of a plurality of characters in the character set:
receive encoded specifications for the character;
responsive to the point size of the character set being smaller than a predetermined point size:
interpret the encoded specifications to draw the character as a bitmap at increased resolution; and
scan the bitmap to generate a plurality of software instructions containing variable-intensity pixel-drawing function calls for displaying the character represented by the bitmap in anti-aliased form;
responsive to the point size of the character set not being smaller than the predetermined point size:
interpret the encoded specifications to draw the character as a bitmap at standard resolution;
scan the bitmap to generate a plurality of software instructions containing pixel-drawing function calls for displaying the character represented by the bitmap in non-anti-aliased form; and
selectively replace at least two pixel-drawing function calls with a line-drawing function call; and
compile the source code to generate executable code, the generated executable code being directly executable without compilation;

computer-readable program code devices configured to cause a computer to store the generated executable code; and computer-readable program code devices configured to cause a computer to selectively execute the stored executable code to display characters on the output device.

41. A computer program product comprising a computer-usable medium having computer-readable code embodied therein for displaying text on an output device, comprising:

computer-readable program code devices configured to cause a computer to provide executable code for rendering at least one character in a character set comprising a plurality of characters, each character having characteristics, the executable code being directly executable without compilation;

computer-readable program code devices configured to cause a computer to identify for display one of the characters in the character set;

computer-readable program code devices configured to cause a computer to determine characteristics for display of the identified character; and computer-readable program code devices configured to cause a computer to execute the executable code using the determined characteristics to display the identified character on an output device.

\* \* \* \* \*